United States Patent
Becker et al.

(10) Patent No.: US 7,297,756 B2
(45) Date of Patent: Nov. 20, 2007

(54) MELT-ADHESIVES FOR SEALING OFF ROCKS OR BUILDING MATERIALS

(75) Inventors: Bettina Becker, Monheim (DE); Ingolf Scheffler, Neuss (DE); Juergen Wichelhaus, Wuppertal (DE); Liane Meuten, Monheim (DE)

(73) Assignee: Henkel Kommanditgesellschaft Auf Aktien, Duesseldorf (DE)

( * ) Notice: Subject to any disclaimer, the term of this patent is extended or adjusted under 35 U.S.C. 154(b) by 0 days.

(21) Appl. No.: 10/312,916

(22) PCT Filed: Jun. 21, 2001

(86) PCT No.: PCT/EP01/07206

§ 371 (c)(1), (2), (4) Date: Sep. 17, 2003

(87) PCT Pub. No.: WO02/00764

PCT Pub. Date: Jan. 3, 2002

(65) Prior Publication Data

US 2004/0028482 A1 Feb. 12, 2004

(30) Foreign Application Priority Data

Jun. 30, 2000 (DE) ................. 100 31 992

(51) Int. Cl.
C08G 69/04 (2006.01)
C08G 69/34 (2006.01)
C09J 177/08 (2006.01)
E02D 3/12 (2006.01)
C09K 17/00 (2006.01)

(52) U.S. Cl. ............... 528/310; 528/288; 528/332; 528/335; 455/263; 455/267

(58) Field of Classification Search ........ 528/310, 528/288, 332, 335; 405/263, 267
See application file for complete search history.

(56) References Cited

U.S. PATENT DOCUMENTS

| | | | |
|---|---|---|---|
| 4,396,759 A | 8/1983 | Drawert et al. ........ 528/339.3 |
| 4,652,327 A | 3/1987 | Hayes et al. .......... 156/244.22 |
| 4,791,164 A * | 12/1988 | Wichelhaus et al. ....... 524/514 |
| 4,853,460 A | 8/1989 | Harman ................ 528/339.3 |
| 4,882,414 A | 11/1989 | Wroczynski ............ 528/339.3 |
| 4,912,196 A * | 3/1990 | Leoni et al. ............ 528/339.3 |
| 5,548,027 A | 8/1996 | Heucher et al. .......... 525/179 |
| 5,672,677 A * | 9/1997 | Morganelli et al. ...... 528/339.3 |
| 5,778,937 A * | 7/1998 | Sundermann ............. 138/97 |
| 5,807,025 A * | 9/1998 | Sundermann .......... 405/184.2 |
| 6,573,319 B1 | 6/2003 | Birnbrich et al. ......... 524/224 |
| 6,670,442 B1* | 12/2003 | Rossini et al. ........... 528/310 |

FOREIGN PATENT DOCUMENTS

| | | |
|---|---|---|
| DE | 197 28 088 A1 | 2/1999 |
| EP | 0 045 383 A2 | 2/1982 |
| EP | 0 182 957 A1 | 6/1986 |
| EP | 0 334 667 A2 | 9/1989 |
| EP | 1 013 694 A1 | 6/2000 |
| WO | WO 00/12863 A1 | 3/2000 |

OTHER PUBLICATIONS

"Standard Test Method for Apparent Viscosity of Hot Melt Adhesives and Coating Materials", American Society for Testing and Materials, ASTM D 3236, pp. 1-8 (1999).
"Standard Test Methods for Softening Point of Resins Derived from Navel Stores by Ring-and-Ball Apparatus", American Society for Testing and Materials, ASTM E 28. pp. 1-6 (1999).
Arbeitsgruppe Felsinjektion, Schlubbericht, pp. 61-63, May 1984.
"Cross-recessed pan head plastic screws", DIN Deutsches Institut fur Normung e V. Berling, DIN 34812, pp. 1-4 (1999).

* cited by examiner

*Primary Examiner*—Duc Truong
(74) *Attorney, Agent, or Firm*—Woodcock Wasbhurn LLP

(57) ABSTRACT

Polyamide hot-melt adhesives based on the reaction products of polymeric fatty acids, $C_{14}$-$C_{18}$ monocarboxylic acids, $C_6$-$C_{12}$ dicarboxylic acids and diamines which do not contain any water-extractable, environmentally toxic constituents, which are suitable for sealing cavities in soils, in rock formations, building structures and/or walls, in particular for sealing tunnels, galleries, shafts, channels or caverns, to protect against the penetration of water or the penetration of liquids or gases which contain hazardous substances.

11 Claims, No Drawings

MELT-ADHESIVES FOR SEALING OFF ROCKS OR BUILDING MATERIALS

CROSS REFERENCE TO RELATED APPLICATIONS

This application is a national stage application under 35 USC 371 of international application PCT/EP01/07206, the international application not being published in English. This application also claims priority under 35 USC 119 to DE 100 31 992.0, filed on Jun. 30, 2000.

BACKGROUND OF THE INVENTION

This invention relates to hot-melt adhesives based on polyaminoamides and the use thereof for sealing cavities and cracks in soils, in rock formations, building structures and/or walls.

Walling and cavities in soils, rocks or in mines, in particular in building structures, such as tunnels, galleries, shafts, channels and caverns, have to be sealed in order to provide protection from penetration by water or penetration by liquids or gases containing dangerous substances. For this purpose, a liquid sealing materials is introduced under pressure (injected) into the adjoining rock or the adjoining soils via a sealed drilled hole.

Known injection liquids are cement suspensions, solutions or dispersions of polyurethane resins or epoxide resins and liquid multi-component polyurethane resins or epoxide resins. These injection liquids have the disadvantage of very long curing times which cannot be adjusted exactly. In large building structures, such as tunnels, this produces severe technical difficulties, in particular when it leads to so-called "back-flow", that is when there are cracks, gaps, pores or fissures at the surface of the rock or masonry through which the injection liquids may escape before they have cured. This means that sufficient injection pressure cannot be built up so that the cracks, fissures or cavities are not sufficiently filled which results in defective sealing. Hitherto, in these cases, it has proved helpful to seal the fissures found at the surface with a rapid-setting mortar or to use a particularly rapid-curing injection resin at the escape points. Furthermore, it is difficult to introduce these injection resins in such a way that shrinkage during the curing process does not jeopardise the sealing function. DE-A-19728088 suggests a method for sealing structural parts by injecting gel-forming waterglass solutions in which the waterglass solution is mixed with esters or an aqueous curing solution which contains alkali metal aluminates, salts of alkaline earth metal cations, acidic water-soluble salts, glyoxal or organic acids or compounds thereof, before feeding to the site of injection or when emerging from the site of injection. This converts the waterglass solution into a gel. Although these types of gel-forming systems may be formulated so that gel production takes place very rapidly, they have the critical disadvantage that they do not have a high gap-bridging effect, in particular if these gaps are also intended to be sealed against water which is under pressure.

To overcome these technical difficulties in the processes disclosed hitherto, WO 00/12863 suggests a process for sealing rock or building materials and a device for this in which hot hot-melt adhesives with a low viscosity and rapidly produced initial strength are injected under high pressure into the rock or building material via the drilled hole, whereupon they penetrate into the fissures and pores in the rock or building material to be sealed. After the hot-melt adhesive cools and solidifies, the pores and fissures are sealed and permanently closed up. It is suggested that polyamides or gels with polyamide-like properties are used for this purpose. No data about the composition of the hot-melt adhesives suitable for this purpose are given in this document. In particular, no data at all on ecological compatibility are given.

Starting from the prior art, the inventor has noted the object of providing polyaminoamide hot-melt adhesives which are suitable for the previously mentioned objective of sealing cavities in soils, in rock formations, building structures and/or walls.

SUMMARY OF THE INVENTION

The solution according to the present invention is given in the claims. It consists substantially of the provision of polyaminoamides based on the reaction products of polymeric fatty acids, $C_{14}$-$C_{18}$ monocarboxylic acids, $C_6$-$C_{12}$ dicarboxylic acids and diamines which do not contain any water-extractable or environmentally toxic constituents.

Another important aspect of the polyaminoamide hot-melt adhesives according to the present invention is the provision of a suitable viscosity/temperature profile so that they have a sufficiently low viscosity at temperatures of about 190-200° C. for them to be injected into masonry or rock formations in sufficient volume, using available pumps, without the use of an unacceptably high build-up of pressure and without thermal decomposition of the hot-melt adhesive. Furthermore, the hot-melt adhesive must have a rapidly produced initial strength.

By heating the polyamide hot-melt adhesives with a rapidly produced initial strength, thes are converted into a low viscosity state which means that they may penetrate into even the smallest fissures, pores, cracks, etc. in rock and building materials. The hot-melt adhesives are injected into the drilled hole under pressure and from there out into the pores and fissures of the rock or building material, wherein the temperature of the hot-melt adhesive decreases with depth of the pores so that, as from a specific depth of penetration from the drilled hole, which depends on the initial temperature, the hot-melt adhesive becomes more and more viscous and finally solidifies. As a result of the pressure of the hot-melt adhesive following behind, the hot-melt adhesive which has already become more viscous is pushed still deeper into the pores or fissures. If the hot-melt adhesives have been heated to a sufficiently high temperature, they are hot enough for the liquid heated hot-melt adhesive to be able to penetrate deeply into the pores of the rock or building material before they cool and solidify. To support this process, the adjoining rock, masonry or soil may be pre-heated prior to injection.

On contact with water, the hot-melt adhesives take up a limited amount of water which increases the volume of the hot-melt adhesive. The hot-melt adhesive expands further into the pores and fissures which means that the rock or building material is even more tightly sealed. If the sealed rock or building material is subjected to water or moisture, then a structure is built up, due to the increase in volume of the hot-melt adhesive as a result of absorbing water, which may withstand even a high hydrostatic pressure over the long term.

When using hot-melt adhesives according to the present invention, the injection process is preferably repeated several times, wherein the hot-melt adhesive which has already penetrated into fissures and pores in the rock or building material to be sealed may at least slightly cool between injection processes and fresh, heated hot-melt adhesive may penetrate into other fissures and pores during the next injection process.

The advantage of this "stop-go" procedure is that even when back-flow of the hot-melt adhesive takes place (e.g. due to fissures which lead to the surface of the rock or masonry), nevertheless a rapid, reliable build up of pressure is possible. In conventional processes, e.g. when using epoxide resins, in the event of back-flow occurring the corresponding fissures have hitherto still had to be sealed with "rapid setting mortar" or very rapid curing epoxide resins have had to be used at the escape points; these are very difficult to handle under the conditions of application due to their short pot lives. In addition, as a result of the "stop-go" process which is possible using hot-melt adhesives according to the present invention, shrinkage of the hot-melt adhesive during cooling is also compensated for by the hot-melt adhesive which is forced to follow on.

For deep penetration of the heated hot-melt adhesive into the rock or building material, it is an advantage if, before injecting the heated hot-melt adhesive into the rock or building material, a temperature gradient is set up in the rock or building material by a pre-heating procedure. In order to prevent premature consolidation due to cooling by the cold rock or building material, this is heated before introducing the hot-melt adhesive.

By pre-heating the rock or building material to be sealed, it is also possible to use hot-melt adhesive with a rapidly produced initial strength which has been heated to a lower temperature for sealing purposes because it does not solidify immediately at the surface of the cold rock or building material, due to the already elevated temperature of the rock or building material.

The heated hot-melt adhesives are preferably introduced into the drilled hole with a temperature between 50 and 300° C., particularly preferably between 130 and 250° C. and with a pressure of 1 to 500 bar. The pressure and temperature of the hot-melt adhesive depends on the characteristics thereof, on the density, degree of fissuring or porosity of the rock or building material and on the ambient temperature and the depth of penetration of hot-melt adhesive required and the thermal stability thereof.

Hot-melt adhesives which may be processed under the previously mentioned boundary conditions, must therefore satisfy four basic prerequisites:
  they must be thermally stable over the long term in order to withstand repeated heating to the application temperature without decomposing.
  they must have a very low melt viscosity at the application temperatures of between about 130 and 250° C. and at the same time have a high initial strength on cooling and solidifying.
  they should have no constituents which may be extracted in water and have environmentally toxic properties.
  they must have a sufficiently long open time to be injected into the cavities in adequate amounts per unit of time.

According to the present invention, polyaminoamides may be used for a high specification application of this type which are prepared from the following components:
  20-99 mol. %, preferably 30-95 mol. %, of dimeric or polymeric fatty acids
  0-50 mol. %, preferably 0-30 mol. %, of $C_{14}$-$C_{18}$ monocarboxylic acids
  0-80 mol. %, preferably 5-70 mol. %, of $C_4$-$C_{12}$ dicarboxylic acids
  20-85 mol. % of aliphatic diamines
  0-70 mol. % of cycloaliphatic diamines
  0-60 mol. % of polyoxyalkylene diamines
  0-50 mol. %, preferably 0-30 mol. %, of monofunctional amines.

Dimeric or polymeric fatty acids, in the context of the present invention, are those fatty acids which are prepared in a known manner by dimerising unsaturated long-chain fatty acids obtained from naturally occurring raw materials and are then further purified by distillation. Technical grade dimeric fatty acids contain, depending on the degree of purity, up to 5 wt. % of monobasic fatty acids, substantially $C_{18}$ fatty acids, 60-95 wt. %, sometimes up to 98 wt. %, of $C_{36}$ dibasic fatty acids (dimeric fatty acids in the stricter sense) and 1-35 wt. % of $C_{54}$ and higher polybasic fatty acids ("trimeric fatty acids"). The relative ratios of monomeric, dimeric and trimeric fatty acids in the polymeric fatty acid mixture depends on the nature of the starting compounds used and on the conditions of polymerisation, dimerisation or oligomerisation and the extent of separation by distillation. Dimeric fatty acids purified by distillation contain at least 70 wt. %, preferably 80 wt. % and frequently 95-99 wt. % of dimeric fatty acids. In a further process step, these dimeric fatty acids may also be hydrogenated.

In addition to the dimeric or polymeric fatty acids, the acid component of the polyamide may also contain $C_4$-$C_{14}$ dicarboxylic acids. Examples of these types of dicarboxylic acids are maleic acid, succinic acid, adipic acid, azelaic acid, sebacic acid, dodecanedicarboxylic acid, glutaric acid, suberic acid, pimelic acid or also aromatic dicarboxylic acids, such as terephthalic acid or mixtures of the previously mentioned dicarboxylic acids.

The diamine component consists substantially of one or more aliphatic diamines, preferably with an even number of carbon atoms, wherein the amino groups are at the ends of the carbon chain. The aliphatic diamines may contain 2 to 20 carbon atoms, wherein the aliphatic chain may be linear or slightly branched. Particularly preferred aliphatic diamines are $C_4$-$C_{12}$ diamines with an even number of carbon atoms.

The amino component may also contain cyclic diamines or heterocyclic diamines, such as 1,4-cyclohexane diamine, 4,4'-diaminodicyclohexylmethane, piperazine, cyclohexane-bis-(methylamine), isophorone diamine, dimethylpiperazine, dipiperidylpropane and dimeric diamines (amines prepared from dimeric fatty acids).

In addition, if the polyaminoamide in intended to have high flexibility, polyoxyalkylene diamines, such as polyoxyethylene diamine, polyoxypropylene diamine or bis-(diaminopropyl)-polytetrahydrofuran, may also be used. The polyoxyalkylene diamines also known as "Jeffamines" (tradename of the Huntsman Co.) are particularly preferred. The molecular weight of the Jeffamines used is between 200 and 4000, preferably between 400 and 2000.

Hot-melt adhesives to be used according to the present invention may also contain polyepoxides, polyols and polyesters as additional structural components.

By selecting the short-chain diamines and the short-chain dicarboxylic acids and also the purity of the dimeric fatty acids, both the viscosity and the viscosity/temperature profile and also the softening point of the hot-melt adhesive may be adjusted in such a way that the hot-melt adhesive is suitable for the use according to the present invention. The hot-melt adhesive should have a melt viscosity of 50-10,000, preferably 100-4000 mPa·s, at 180° C. measured in accordance with ASTM D 3236, so that the hot-melt adhesive may be efficiently pumped in the temperature range between 180 and 250° C. using conventional pumps and so that it may be injected into the area of application without any difficulty. A polyaminoamide hot-melt adhesive which is extremely suitable for the process according to the present invention has, for example, a viscosity of 450 mPa·s at 190° C., still has a viscosity of 250 mPa·s at 200° C. and still has a viscosity of 125 mPa·s at 230° C. The softening point of a hot-melt adhesive of this type is about 185° C., measured using the "ring and ball" method ASTM E 28.

Polyaminoamide hot-melt adhesives have to be protected from thermal and oxidative degradation with the aid of stabilisers, in particular when they are subjected to thermal stress which is as high as that in the case of applications according to the present invention. The stabilisers usually used for this purpose, e.g. based on aryl phosphates, are not suitable for introduction into water-bearing layers of rock or soil regions. Although they are very effective with regard to the stabilising effect thereof on the hot-melt adhesive, tests have demonstrated that these stabilisers may be extracted by water and that water contaminated in this way has a high toxic effect on daphnia and algae. Hot-melt adhesives stabilised in this way would contaminate the adjoining groundwaters and therefore cannot be used for this purpose for ecological reasons. According to the present invention, those stabilisers are preferably used which have already been firmly incorporated into the polyamide molecule during the polycondensation process, that is the manufacturing process for the polyamide. These stabilisers are incorporated so firmly in the polymer structure that they cannot be extracted by water. Therefore the use of hot-melt adhesives of this type does not lead to any ecological damage, even in water-bearing rock or soil formations. The toxicity value of the stabiliser used (determined as the EC50 value in mg/l) should be as high as possible and the water-solubility (in mg/l) of the stabiliser should be as low as possible. The water-solubility of the stabiliser used should preferably be well below about 0.5 mg/l and the EC50 value for daphnia magna or algae should be greater than about 50 mg/l. Particularly suitable stabilisers are, for example, long-chain arylalkylamines or pentaerythrityl tetrakis(3-(3,5-di-tert.-butyl-4-hydroxyphenyl) propionate (Irganox 1010, Ciba Specialty Chemicals).

The present invention is explained in more detail using the non-limiting Examples given below.

EXAMPLES

The polyamide hot-melt adhesive "Macromelt TPX 20-345" (Henkel KGaA) was selected for the following Examples. This hot-melt adhesive has a viscosity of 450 mPa·s at 190° C., still has a viscosity of 250 mPa·s at 200° C. and still has a viscosity of 125 mPa·s at 230° C. Its softening point is 185° C., measured by the "ring and ball" method, ASTM E 28. The adhesive contained a dialkylarylamine as stabiliser.

Tests on "Bolesta radial flow" showed that this hot-melt adhesive may be injected. The test arrangement used was in accordance with the data given in "Arbeitsgruppe Felsinjektion, SchluBbericht, May 1984", pages 61-63.

Example 1

Test arrangement: Polyamide hot-melt adhesive "Macromelt TPX 20-345" (Henkel KGaA, Düsseldorf) was heated to 220° C. and injected at 150 bar (machine pressure) into a 1 inch water pipe which was filled with soil material. To ensure a heat reservoir, a small cavity was made at the inlet point. The transfer piece was preheated using a hot air blower. After completing injection of the polyamide, a pressure check was performed with compressed air in the opposite direction to that of the initial injection.

The pipe was filled with dry chippings (about ⅜ mm, small proportion of dust) and the test arrangement was connected directly to the feed-point for hot-melt adhesive. After completing injection of the polyamide, it was shown that the hot-melt adhesive had completely filled the entire length of the piece of test pipe (2 m); a pressure test showed that the filling was pressure-tight up to the maximum achievable pressure of 10 bar of compressed air. Then a pressure test was performed using oil pressure; the filling was pressure-tight up to 10 bar.

Example 2

Test arrangement same as in Example 1. The pipe was filled with a mixture of sand, gravel and chippings with a high proportion of fine material, saturated with water and compacted by slurrying.

It was shown that the depth of penetration of hot-melt adhesive was up to about 1.2 m. A pressure test showed that the filling was pressure-tight up to the maximum achievable pressure of 10 bar compressed air. Then a pressure test was performed using oil pressure, wherein it was shown that the filling was pressure-tight up to the maximum achievable oil pressure of 60 bar.

The two trials 1 and 2 demonstrated very rapid sealing against high water pressure (up to 60 bar) with long-term effectiveness.

Example 3

Test arrangement (similar to that in the "Bolesta" method): "Macromelt TPX 20-345" (Henkel KGaA, Dusseldorf) was heated to 220° C. and injected at 150 bar (machine pressure) in the molten state between two exposed aggregate concrete slabs. The distance between the slabs was about 2 mm. The space between the slabs was sealed with a rubber sealant in such a way that the air found therein could be displaced. The slabs were fixed firmly in place with wires in order to prevent any lifting.

Within a few seconds after staring to inject the polyamide, the gap between the slabs was filled completely. Due to the pressure, a crack was produced in the upper slab, through which polyamide emerged. After a few minutes of curing time, polyamide was injected once more and this melted the polyamide already present so that more injection material emerged from the gap.

This Example demonstrates that complete filling of gaps and fissures in rocks or masonry is easy and simple to perform.

Example 4

To check for environmental compatibility, test sheets with the dimensions 16 cm×13 cm×2 cm were prepared from the polyamide hot-melt adhesive and subjected to a migration test using the trough method. Here, three test sheets were each placed in contact with 2.3 l of deionised water in sequence for 1 day, 2 days and finally 4 days at room temperature. After each contact period, the test water was withdrawn completely for analysis and replaced by fresh deionised water. In addition to the overall composition of the test water, the release of organic substances was determined on the basis of organically bonded carbon (TOC) and the release of substances which are capable of coupling was determined in accordance with DEV H 16 (phenol index).

Furthermore, the test water from the first and third migration periods were subjected to toxicity tests according to DIN 38412 part 33 (algal growth test), DIN 38412 part 11 (daphnia test) and the luminous bacteria test (DIN 38412 L 34/341). The test water was not noticeably affected with regard to color, turbidity or the tendency to form foam. The release of organic compounds (TOC) varied between 1.3 and 2.2 mg/l and is assessed as being very low; it decreased substantially during the trial period. The migration of substances capable of coupling (phenol index) fell to 0.008 mg/l over the course of the test. It should be noted here that the limit of detection is about 0.005 mg/l; water with this type of low phenol index is of drinking water quality. The daphnia toxicity decreased greatly from the first trial stage to the third trial stage; the EC50 value changed from 400 g of eluate/l to 950 g of eluate/l. The inhibitory effect of the test water on algal growth also showed very little toxicity. The daphnia toxicity and the inhibitory effect of the test water on algal growth are classified as "zero" at dilutions likely to be encountered in practice. This value is based on a suggestion by Th. Grunder, H-P. Lühr, W. Rummel and R. Stock ("Entwicklung und Erprobung eines System zur Bewertung und Einstufing der ökologischen Verträglichkeit von Produkten hinsichtlich ihrer Grundwasser- und Bodengefährdung", IWS at TU Berlin, AZ:05624). The determination of luminous bacteria toxicity gave a value of GL=3 for test water from the first stage; this means that the eluate has only negligible luminous bacteria toxicity.

These toxicity data demonstrate that hot-melt adhesives to be used according to the present invention do not produce any unacceptable effects in groundwater.

Example 5 (Comparison)

A hot-melt adhesive with the same polymer composition as in the previous Examples, which contained isodecyl-diphenyl phosphate as a stabiliser in accordance with the prior art, was subjected to the environmental compatibility tests described in Example 4. The following values were found: Phenol index 0.3 mg/l, this value remained constant at the same high value even after long elution times
TOC: between 3.3 and 5.6 mg/l
Daphnia toxicity, $G_D$=10, no tendency to decrease over the test period,
Algal toxicity, $G_D$=50 to 100, no tendency to decrease over the test period.
These values show that a conventionally stabilised hot-melt adhesive releases toxic substances into the eluate water for an unacceptably long time and therefore is not suitable for use in groundwater-bearing formations.

What is claimed is:
1. A method of using a polyamide compound to seal cavities in soil, rock formations, building construction and walls comprising:
   injecting into said cavities a polyamide compound comprised of the reaction product of dimeric or polymeric fatty acids, $C_4$-$C_{12}$ dicarboxylic acids, and one or more diamines,
   wherein:
      the polyamide compound is stabilized by the addition of a stabilizer selected from the group consisting of long chain arylalkylamines and pentaerythrityl tetrakis 3-(3,5-di-tert-butyl-4-hydroxyphenyl) propionate;
      the polyamide compound does not contain any water-soluble or water-extractable environmentally toxic constituents, and
      the polyamide compound has a melt viscosity of 50 to 10,000 mPa·s, at 190° C., measured according to ASTM D 3236.
2. The method of claim 1, wherein the reaction product is prepared using components comprised of:
   20 to 99 mol. % of polymeric fatty acids;
   0 to 50 mol. % of $C_{14}$-$C_{18}$ is monocarboxylic acids;
   up to 80 mol. % of $C_4$-$C_{12}$ dicarboxylic acids;
   20 to 85 mol. % of aliphatic diamines;
   0 to 70 mol. % of cycloaliphatic diamines;
   0 to 60 mol. % of polyoxyalkylene diamines; and
   0 to 50 mol. % of a monofunctional amines.
3. The method of claim 1, wherein the reaction product is prepared using components comprised of:
   30 to 95 mol. % of polymeric fatty acids;
   0 to 30 mol. % of $C_{14}$-$C_{18}$ monocarboxylic acids;
   5 to 70 mol. % of $C_4$-$C_{12}$ dicarboxylic acids;
   20 to 85 mol. % of aliphatic diamines;
   0 to 70 mol. % of cycloaliphatic diamines;
   0 to 60 mol. % of polyoxyalkylene diamines; and
   0 to 30 mol. % of monofunctional amines.
4. The method of claim 1, wherein the water-soluble or water extractable constituents have a daphnia toxicity EC50 of >300 g eluate/l.
5. A method of using a polyamide compound to seal cavities in soil, rock formations, building construction and walls comprising:
   injecting into said cavities a polyamide compound comprised of the reaction product of dimeric or polymeric fatty acids, $C_4$-$C_{12}$ dicarboxylic acids, and one or more diamines,
   wherein:
      the polyamide compound is stabilized by the addition of a stabilizer selected from the group consisting of long chain arylalkylamines and pentaerythrityl tetrakis 3-(3,5-di-tert-butyl-4-hydroxyphenyl) propionate; and
      the polyamide compound does not contain any water-soluble or water-extractable environmentally toxic constituents when tested in accordance with DIN 38412 part 11 on daphnia when the test water is diluted at a rate of 1:10.
6. The method of claim 5, wherein the reaction product is prepared using components comprised of:
   20 to 99 mol. % of polymeric fatty acids;
   0 to 50 mol. % of $C_{14}$-$C_{18}$ monocarboxylic acids; up to 80 mol. % of $C_4$-$C_{12}$ dicarboxylic acids;
   20 to 85 mol. % of aliphatic diamines;
   0 to 70 mol. % of cycloaliphatic diamines;
   0 to 60 mol. % of polyoxyalkylene diamines; and
   0 to 50 mol. % of monofunctional amines.
7. The method of claim 5, wherein the reaction product is prepared using components comprised of:
   30 to 95 mol. % of polymeric fatty acids;
   0 to 30 mol. % of $C_{14}$-$C_{18}$ is monocarboxylic acids;
   5 to 70 mol. % of $C_4$-$C_{12}$ dicarboxylic acids;
   20 to 85 mol. % of aliphatic diamines;
   0 to 70 mol. % of cycloaliphatic diamines;
   0 to 60 mol. % of polyoxyalkylene diamines; and
   0 to 30 mol. % of monofunctional amines.
8. The method of claim 5, wherein the polyamide compound has a melt viscosity of 50 to 10,000 mPa·s, at 190° C., measured according to ASTM D 3236.
9. The method of claim 1, wherein the long chain arylalkylamine is a dialkylarylamine.
10. The method of claim 5, wherein the long chain arylalkylamine is a dialkylarylamine.

11. A method of using a polyamide compound to seal cavities in soil, rock formations, building construction and walls comprising:
  injecting into said cavities a polyamide compound comprised of the reaction product of dimeric or polymeric fatty acids, $C_4$-$C_{12}$ dicarboxylic acids, and one or more diamines,
  wherein:
    the polyamide compound is stabilized by the addition of a stabilizer selected from the group consisting of long chain arylalkylamines and pentaerythrityl tetrakis 3-(3,5-di-tert-butyl-4-hydroxyphenyl) propionate;
    the polyamide compound does not contain any water-soluble or water-extractable environmentally toxic constituents, and
    the compound has a melt viscosity of 50 to 10,000 mPa·s, at 190° C., measured according to ASTM D 3236.

* * * * *